Figure 1:
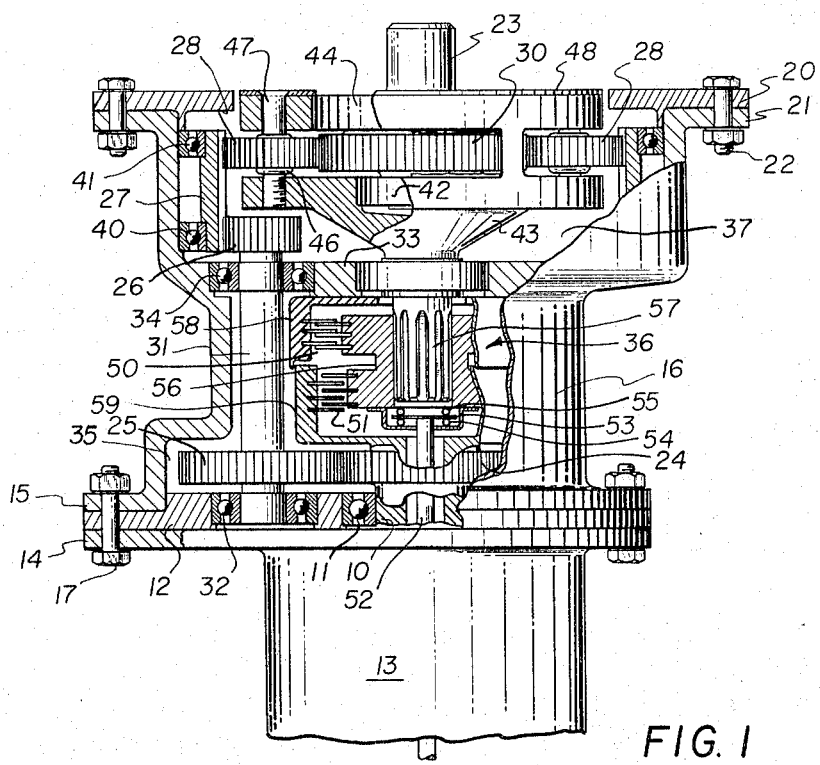

Jan. 3, 1967   P. H. ROBERTS ET AL   3,295,393
TRANSMISSION
Filed May 6, 1964

INVENTORS
PHILLIP H. ROBERTS
WILLIAM R. SNOOK, JR.
BY Ronald W. Mayes
ATTORNEY

United States Patent Office 3,295,393
Patented Jan. 3, 1967

3,295,393
TRANSMISSION
Phillip H. Roberts, New Orleans, La., and William R. Snook, Jr., Wichita, Kans., assignors to The Boeing Company, Seattle Wash., a corporation of Delaware
Filed May 6, 1964, Ser. No. 365,285
1 Claim. (Cl. 74—705)

This invention relates to transmissions. More particularly this invention relates to multi-speed transmissions.

It is an object of this invention to provide a new and improved transmission.

It is a further object of this invention to provide a new and improved two-speed planetary gear transmission comprising only simple gears and having no compound gears.

Yet another object of this invention is the provision of a novel two-speed transmission that is constantly connected for slow speed drive but has engageable means for increasing the speed of the transmission to a high speed drive without disconnecting the low speed drive.

A still further object of this invention is the provision of a novel two-speed transmission of relatively simple and sturdy construction, having high reliability, long life, and economy of manufacture and maintenance.

A further object of this invention is the provision of a novel two-speed transmission as set forth in the preceding paragraphs wherein the input and/or output drives can be reversed.

Figure 2:
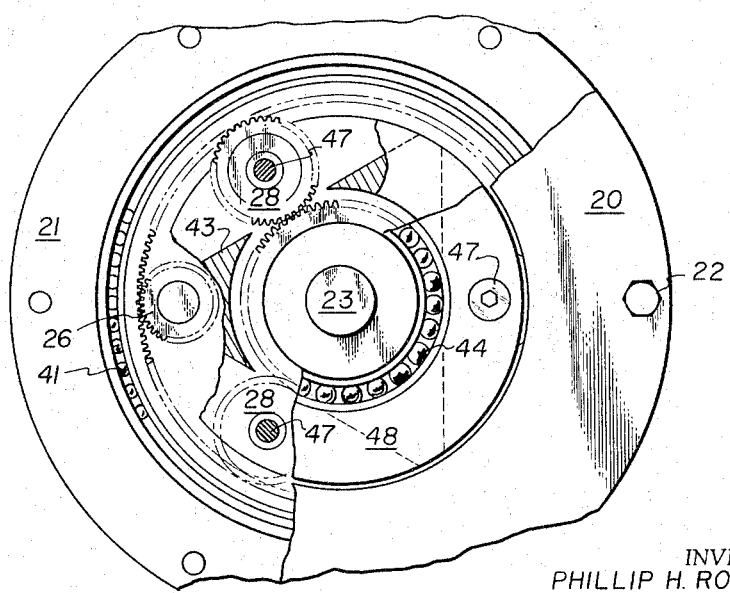

The invention further resides in certain novel features of construction, combinations, and arrangements of parts and further objects and advantages of the invention will be apparent to those skilled in the art to which it pertains from the following description of the present preferred embodiment thereof described with reference to the accompanying drawings, which form a part of this specification, wherein the same reference numerals indicate corresponding parts throughout the several views, and in which:

FIG. 1 is an elevational view of a transmission embodying the invention with certain parts shown broken away and in section to show certain internal details thereof; and FIG. 2 is a top plan view of FIG. 1 with parts broken away and in section to further show certain internal details thereof.

It is to be understood that the invention is not limited to the details of construction and the arrangements of parts shown in the drawings and hereafter described in detail, but is capable of being otherwise embodied and of being practiced and carried out in various ways. It is to be further understood that the terminology employed herein is for the purpose of description and there is no intention to herein limit the invention beyond the requirements of the prior art.

This invention comprises an input shaft 10 of a change speed transmission or gear box. The input shaft 10 is journaled by an antifriction bearing assembly 11 in a journal plate 12. The input shaft 10 is preferably driven by a reversible, constant speed electrical drive motor 13. The drive motor 13 has a housing with an end face plate 14 for supporting the bearing plate 12 and an end flange 15 of a transmission housing 16. The bearing plate 12 is sandwiched between the flanges 14 and 15 and secured in place by a plurality of nuts and bolts 17, FIG. 1. An end plate 20 is bolted to an end flange 21 of the housing 16 by a plurality of nuts and bolts 22, FIG. 1.

The motor 13 when energized, drives the input shaft 10 and an output shaft 23. The drive to the output shaft 23 is transmitted via a drive gear 24, a larger driven gear 25, a smaller gear 26, a ring gear 27, three planet gears 28 and a sun gear 30 fixed to the output shaft 23.

The input shaft 10 and the output shaft 23 are coaxial. The driving gear 24 is fixed to the input shaft 10. The gears 25 and 26 are mounted at opposite ends of a countershaft 31 that is driven in a direction counter to the input shaft 10. Accordingly, the shaft 31 is termed a countershaft. The shaft 31 is parallel to the input shaft 10 and the output shaft 23. The shaft 31 is journaled at its input end in the bearing plate 12 by means of a bearing assembly 32. The output end of the countershaft 31 is journaled in a partition 33 by a bearing assembly 34, FIG. 1. The output end of the countershaft 31 extends through the partition 33.

The partition 33 divides the housing 16 into two compartments. One of the two compartments within the housing 16, as defined by the partition 33, is identified as a clutch and brake compartment 35. This compartment 35 houses the gears 24, 25 and a clutch and brake assembly, indicated generally by the reference numeral 36. The other compartment is a planetary gear compartment 37 that houses the gears 26, 27, 28, and 30. The ring gear 27 is journaled by a pair of coaxial antifriction bearing assemblies 40 and 41 mounted internally of the housing 16. The sun gear 30 is fixed to the output shaft 23. The shaft 23 is journaled at its inner end by a bearing assembly 42 mounted internally of a planet carrier or spider 43. The shaft 23 is journaled at a mid-portion thereof by an antifriction bearing assembly 44 in the planet carrier 43. The bearing assembly 44 is disposed about a cylindrical flange or shoulder forming a part of the output shaft 23.

Each of the planet gears 28 is carried by an antifriction bearing assembly 46 on a stub shaft 47 within a slot in the periphery of the planet carrier 43. Each slot is milled along a chord of the circle described by the arcuate periphery of the cylindrical planet carrier 43. There are three stub shafts 47 and each has its ends supported in the planet carrier 43 and each is equally spaced 120 degrees apart. Preferably the outer ends of the planet stub shafts 47 are headed and provided with Allen wrench slots or openings, FIG. 2. The bearing assembly 44 is retained in place in the planet carrier 43 by an annular bearing retainer plate 48. Preferably the inner ends of the stub shafts 47 are threaded into and suitably locked in place in openings in the planet carrier 43. This is to assure that the planets 28 will rotate on the bearings 46 and the stub shafts 47 will not rotate within the carrier 43. If turning of the stub shafts 47 were permitted, the wear of the stub shafts 28 on the carrier 43 would eventually result in loose tolerances, misalignment, noise, and a changing gear ratio due to the plants 28 moving radially in and out.

The high speed mode of the transmission is accomplished by providing a direct drive to the planet carrier 43 by the input shaft 10. When it is desired to engage the high speed drive of the transmission, a brake 50 is disengaged and a clutch 51 is engaged within the brake and clutch assembly 36. This is preferably accomplished by energizing a solenoid, not shown, within the housing of the motor 13. Motion of the solenoid is transmitted via an actuating rod 52, FIG. 1, to disengage the brake 50 and engage the clutch 51.

When the high speed drive is to be disengaged, the solenoid is deenergized and a spring means, not shown, will restore the rod 52 back to its normal position. This will cause the clutch 51 to be disengaged and the spider brake 50 to be again engaged.

More particularly, the actuating rod 52 operated by the solenoid armature has a pressure plate 53 fixed to one end thereof. This pressure plate is sandwiched between a pair of antifriction thrust bearing assemblies 54 and 55 carried on one end of an axially reciprocable, driven pressure plate member 56. The member 56 is splined to a shaft end 57 of the planet carrier 43.

The clutch and brake assembly 36 comprises two cup-shaped housing members 58 and 59. The member 58 is fixed to the partition 33 of the transmission housing 36. The driven member 56 is telescoped within the member 58. Annular brake disks are fixed into the peripheral surface of a first cylindrical portion of the driven member 56. The member 58 carries annular clutch disks fixed internally thereof that are operatively engaged by the complementary clutch disks carried by the driven member 56. The member 59 is fixed to one end of the input shaft 10 and is rotatably telescoped within the member 58. The member 59 carries annular clutch disks fixed internally thereof that are operatively engaged by complementary clutch disks fixed into the peripheral surfaces of a second cylindrical end portion of the driven member 56.

In the low speed drive mode, the planets 28 are driven in a counterclockwise direction as seen in FIG. 2. However, the planet carrier 43 is driven by the shaft 10 in a clockwise direction when in high speed mode and, accordingly, increases the speed of the planets with an accompanying increase in speed in the output shaft 23.

It will be understood that this invention can be modified to adapt it to various circumstances and conditions, and it is accordingly desired to comprehend within the purview of this invention such modifications as may be considered to fall within the scope of the appended claim.

In a reversible multi-speed transmission, a housing having a partition, a bearing plate fixed to one end of said housing, an input shaft journaled in said bearing plate, an output shaft coaxially mounted with said input shaft in said housing, a ring gear journaled internally of said housing, a sun gear, planet gears operatively engaging said ring gear and said sun gear, a carrier member journaled in said partition and journaled on said output shaft and carrying said planet gears, said sun gear being fixed to and driving said output shaft, brake and clutch means disposed between said input shaft and said planet carrier member for normally braking said planet carrier member, means for disengaging said brake means and engaging said clutch means for forming a driving connection between said input shaft and said planet carrier member, drive gear means fixed to and carried by said input shaft, a countershaft disposed within said housing parallel to said input shaft and said output shaft, said countershaft being journaled in said bearing plate and said partition, first gear means fixed to and carried by said countershaft and driven by said drive gear means, second gear means fixed to and carried by said countershaft and means drivingly engaging second gear means and said ring gear in such a manner that said planet gears are driven in the same direction by said ring gear as by said planet carrier member when the latter is directly driven by said input shaft, said housing partition dividing said housing into first and second compartments, said first compartment housing said drive gear means, said first gear means, and said brake and clutch means, and said second compartment housing said second gear means, said ring gear, said planet gears, said sun gear, and said planet carrier member.

References Cited by the Examiner

UNITED STATES PATENTS

| 1,723,231 | 8/1921 | Ellsworth | 74—675 |
|---|---|---|---|
| 2,076,926 | 4/1937 | Timmermann | 74—689 |
| 2,561,499 | 7/1951 | Cohen | 74—688 |

FOREIGN PATENTS

| 617,958 | 4/1961 | Canada. |
|---|---|---|
| 1,004,850 | 4/1952 | France. |
| 1,088,126 | 3/1955 | France. |
| 562,109 | 10/1932 | Germany. |
| 960,520 | 7/1957 | Germany. |
| 544,335 | 4/1942 | Great Britain. |

DAVID J. WILLIAMOWSKY, *Primary Examiner.*

J. R. BENEFIEL, *Assistant Examiner.*